United States Patent
Nago et al.

(10) Patent No.: US 6,530,457 B1
(45) Date of Patent: Mar. 11, 2003

(54) BICYCLE BRAKE DISK WITH ARMS CONNECTING AN INNER ANNULAR PORTION TO AN OUTER ANNULAR PORTION AND TANGENT TO AN EFFECTIVE CIRCLE

(75) Inventors: Daisuke Nago, Sakai (JP); Hisashi Matsui, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/474,692

(22) Filed: Dec. 29, 1999

(51) Int. Cl.[7] .............................. B62L 5/00; F16D 55/02
(52) U.S. Cl. ................. 188/26; 188/17; 188/218 XL; 188/71.6; 188/264 A
(58) Field of Search ............................ 188/24.11, 18 A, 188/17, 26, 218 XL, 264 A, 344, 71.6; D12/180

(56) References Cited

U.S. PATENT DOCUMENTS

| | | | | |
|---|---|---|---|---|
| D381,609 S | * | 7/1997 | Ohata et al. | D12/180 |
| 5,826,685 A | * | 10/1998 | Engle | 188/264 A |
| 5,848,674 A | | 12/1998 | Johnson et al. | 188/18 A |
| 5,950,772 A | * | 9/1999 | Buckley et al. | 188/26 |
| 5,980,407 A | * | 11/1999 | Takamori et al. | 188/264 A |
| 6,003,639 A | * | 12/1999 | Buckley et al. | 188/26 |
| 6,119,818 A | * | 9/2000 | Krumbeck et al. | 188/26 |
| 6,135,248 A | * | 10/2000 | Johnson et al. | 188/218 XL |
| D446,177 S | * | 8/2001 | Ueno | D12/180 |

FOREIGN PATENT DOCUMENTS

| | | |
|---|---|---|
| DE | 298 04 394 U1 | 9/1999 |
| DE | 299 10 528 U1 | 10/1999 |
| DE | 299 15 404 U1 | 1/2000 |
| WO | WO 99/47409 | 9/1999 |

OTHER PUBLICATIONS

Hayes disk brake advertisement, undated, published prior to the filing date of this application.

Hope disk brake advertisement, undated, published prior to the filing date of this application.

Japanese "Yeti" disk brake advertisment, undated, published prior to the filing date of this application.

Japanese Mountain Cycle advertisement, undated, published prior to the filing date of this application.

RST Racing disk brake advertisement, undated, published prior to the filing date of this application.

* cited by examiner

Primary Examiner—Jack Lavinder
Assistant Examiner—Thomas J. Williams
(74) Attorney, Agent, or Firm—James A. Deland

(57) ABSTRACT

A one-piece brake disk for a vehicle includes a radially inner annular portion having a plurality of circumferentially located mounting holes defining a mounting circle; a radially outer annular portion concentric with the radially inner annular portion and having opposite braking surfaces; and a plurality of connecting arms extending from an inner peripheral surface of the radially outer annular portion to an outer peripheral surface of the radially inner annular portion. Each of the plurality of connecting arms is tangent to an effective circle concentric with the mounting circle, wherein the effective circle has a radius greater than a radius of the mounting circle.

24 Claims, 3 Drawing Sheets

BICYCLE BRAKE DISK WITH ARMS CONNECTING AN INNER ANNULAR PORTION TO AN OUTER ANNULAR PORTION AND TANGENT TO AN EFFECTIVE CIRCLE

BACKGROUND OF THE INVENTION

The present invention is directed to bicycle brake devices and, more particularly, to a bicycle brake disk that accommodates heat build up during braking.

Disk brake systems are becoming more popular on mountain bicycles because of their superior braking characteristics under severe operating conditions. A typical disk brake system comprises a brake disk that rotates with the bicycle wheel and a brake caliper that sandwiches the brake disk and presses brake pads against opposite sides of the brake disk. The friction between the brake pads and the brake disk causes the braking function. Not surprisingly, substantial heat is generated where the brake pads contact the brake disk during the braking operation. Since the brake pads ordinarily press against the outer radial surfaces of the brake disk, the generated heat is localized at the radially outer portions of the brake disk. As a result of such uneven heating, the radially outer portions of the brake disk expand while the radially inner portions of the brake disk expand very little, if at all. If very high temperatures are generated during the braking operation, this uneven expansion can cause the brake disk to warp. If the brake disk warps to one side, this can cause one of the brake pads to press against one side of the brake disk more than the other brake pad, thus resulting in further uneven heating and a loss of braking efficiency. If the brake disk warps in a wave shape, severe vibration occurs during braking.

One brake disk that addresses the problem of uneven expansion is disclosed in U.S. Pat. No. 5,848,674. That patent discloses a brake disk having an inner ring and an outer ring interconnected by a plurality of spaced arms. Each arm has a curved L-shape so that the stress in the disk caused by the heat generated in the outer ring can be relieved by radial expansion and contraction of the arms. However, the disadvantage of such a design is that the curved arms are less able to resist the rotational forces of the brake disk during braking because of a cantilevering effect at the curves. Also, the curved arms have lower resistance to side impact forces because the curves act as a pivot point for the outer ring relative to the inner ring during the application of such forces.

SUMMARY OF THE INVENTION

The present invention is directed to a brake disk of the type having an inner annular portion and an outer annular portion interconnected by a plurality of spaced arms, wherein stress in the disk caused by expansion of the outer annular portion is relieved without compromising rotational and lateral rigidity. In one embodiment of the present invention, a one-piece brake for a vehicle includes a radially inner annular portion having a plurality of circumferentially located mounting holes defining a mounting circle; a radially outer annular portion concentric with the radially inner annular portion and having opposite braking surfaces; and a plurality of connecting arms extending from an inner peripheral surface of the radially outer annular portion to an outer peripheral surface of the radially inner annular portion. Each of the plurality of connecting arms is tangent to an effective circle concentric with the mounting circle, wherein the effective circle has a radius greater than a radius of the mounting circle.

In a more specific embodiment, an inner peripheral surface of the radially outer annular portion defines an outer arm connecting circle, and an outer peripheral surface of the radially inner annular portion defines an inner arm connecting circle. For each of the plurality of connecting arms, a straight phantom line connecting an outer midpoint of the connecting arm on the outer arm connecting circle and an inner midpoint of the connecting arm on the inner arm connecting circle intersects the connecting arm along an entire length of the connecting arm. To improve ventilation of the disk, the radially inner annular portion includes a plurality of openings disposed radially outwardly of the plurality of mounting holes, wherein the effective circle intersects the plurality of openings. Also, the radially outer annular portion includes a plurality of circumferentially disposed vent holes, wherein the plurality of vent holes are arranged to form a plurality of L-shapes.

DETAILED DESCRIPTION OF THE EMBODIMENTS

Figure 1:
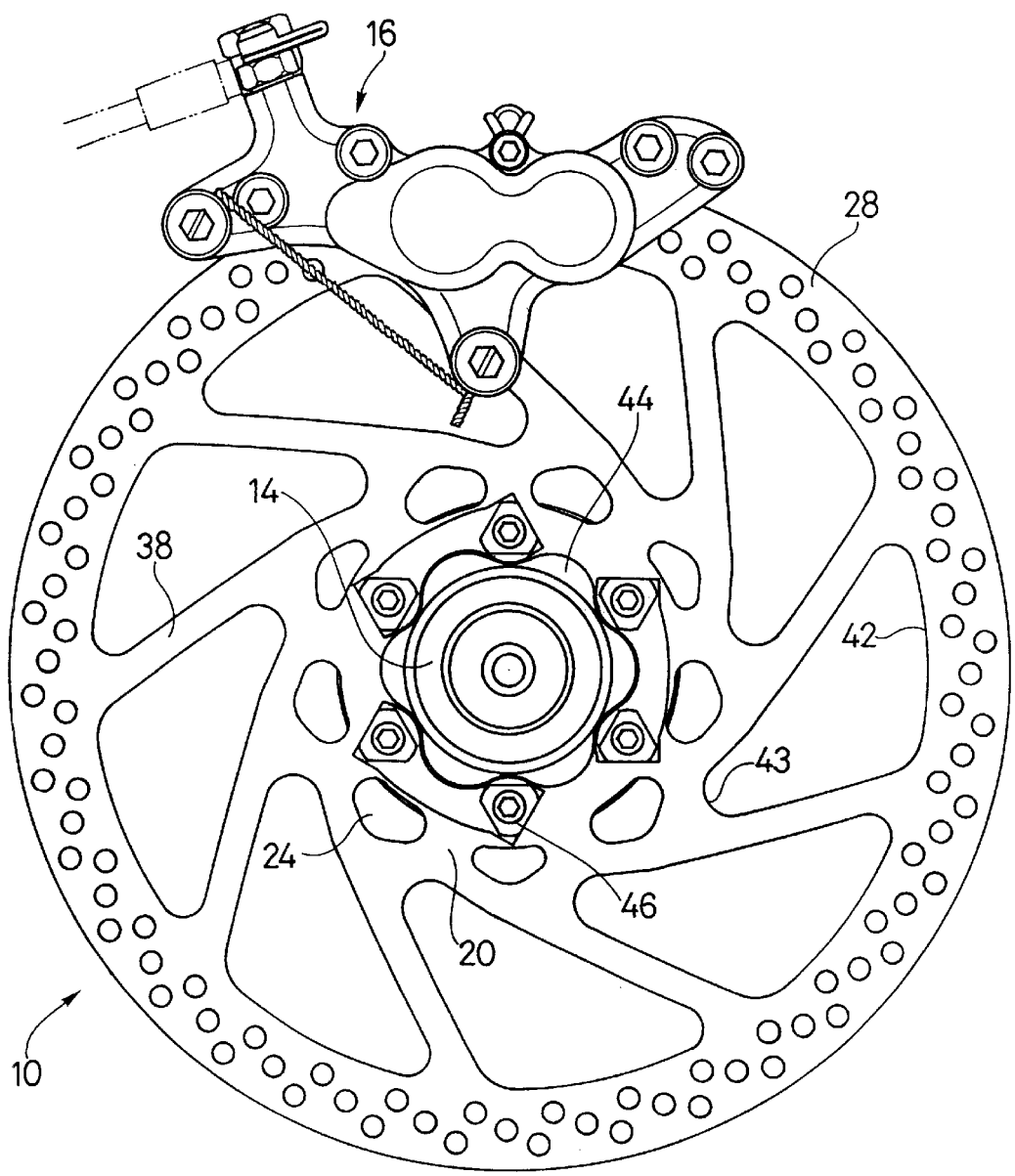
FIG. 1 is a side view of a particular embodiment of a brake disk according to the present invention mounted to a wheel hub and with a superimposed brake caliper.
Figure 2:
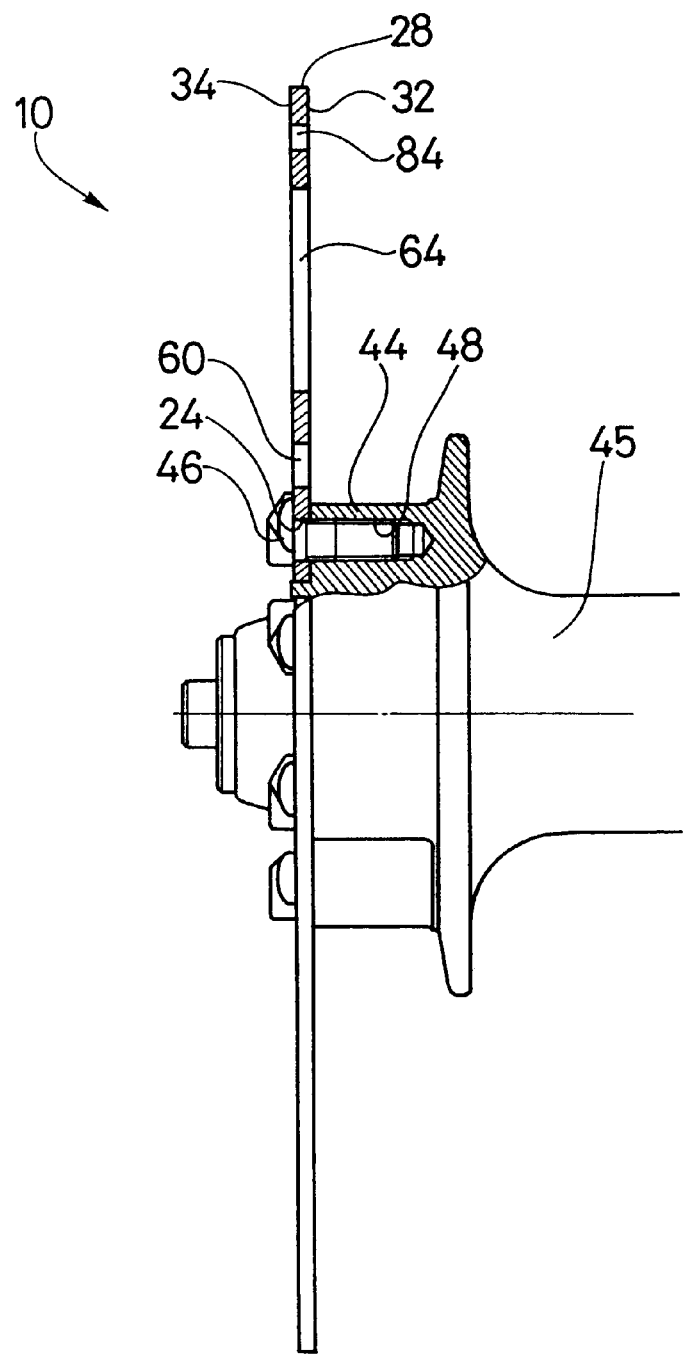
FIG. 2 is a partial cross-sectional front view of the brake disk according to the present invention mounted to the wheel hub.
Figure 3:
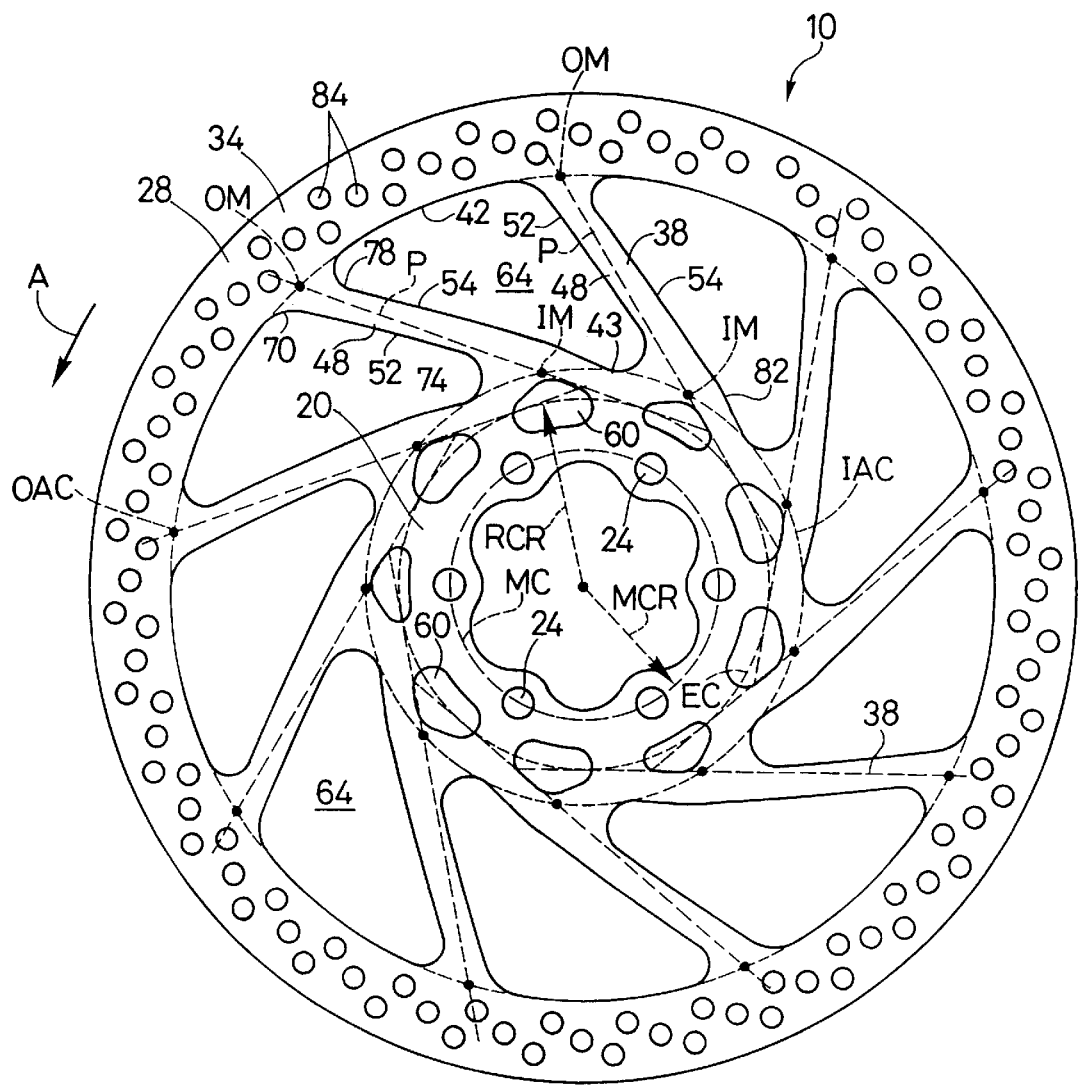
FIG. 3 is a side view of the brake disk alone.

FIG. 1 is a side view of a particular embodiment of a brake disk 10 according to the present invention mounted to a bicycle wheel hub 14 and with a superimposed brake caliper 16, FIG. 2 is a partial cross-sectional front view of brake disk 10 mounted to wheel hub 14, and FIG. 3 is a side view of brake disk 10 alone. As shown in those Figures, and more particularly in FIG. 3, brake disk 10 includes a radially inner annular portion 20 having a plurality of circumferentially located mounting holes 24 defining a mounting circle MC, a radially outer annular portion 28 concentric with the radially inner annular portion 20 and having opposite braking surfaces 32 and 34 (FIG. 2); and a plurality of equally spaced connecting arms 38 extending from an inner peripheral surface 42 of the radially outer annular portion 28 to an outer peripheral surface 43 of the radially inner annular portion 20. As discussed below, each of the plurality of connecting arms 38 is tangent to an effective circle EC concentric with the mounting circle MC, wherein the effective circle EC has a radius ECR greater than a radius MCR of the mounting circle MC. Brake disk 10 is mounted to a mounting flange 44 of wheel hub 14 by bolts 46 that extend through mounting holes 24 and screw into threaded openings (48) in flange 44. Caliper 16 is of the four piston type wherein two pistons (not shown) press against each brake pad (not shown) to apply a stopping force to braking surfaces 32 and 34 in a well known manner.

The mounting circle MC is determined by any circle that intersects the plurality of mounting holes 24. In this embodiment, the mounting circle MC is determined by a circle that intersects the center of each mounting hole 24. To determine the effective circle EC, it should be noted first that inner peripheral surface 42 of the radially outer annular portion 28 defines an outer arm connecting circle OAC, and the outer peripheral surface 43 of the radially inner annular portion 20 defines an inner arm connecting circle IAC. For each connecting arm 38, a straight phantom line P is drawn from an outer midpoint OM of the connecting arm 38 on the outer arm connecting circle OAC through an inner midpoint IM of the connecting arm 38 on the inner arm connecting circle IAC. The effective circle EC is the circle that is tangent to the resulting plurality of phantom lines P as shown in FIG. 3. In this embodiment, the radius of the effective circle EC may be up to twice the radius of the mounting circle MC. In this embodiment, each phantom line P intersects its corresponding connecting arm 38 along an entire length of the connecting arm. This is facilitated by forming the middle portion of each connecting arm 38 as a straight portion 48 having opposite sides 52 and 54.

To reduce the weight of brake disk 10 and to increase the ventilation effect, a plurality of openings 60 are formed in radially inner annular portion 20 radially outwardly from the plurality of mounting holes 24. In this embodiment, each opening 60 has a generally triangular shape with rounded corners, and the effective circle EC intersects the widest portion of each triangle.

Additionally, the side surfaces 52 and 54 of each of the plurality of connecting arms, the inner peripheral surface 42 of outer annular portion 28 and the outer peripheral surface 43 of inner annular portion 20 define a plurality of relatively large circumferentially disposed openings 64. As with openings 60, each opening 64 has a generally triangular shape with rounded corners. Thus, side 52 of each connecting arm 38 forms a curved portion 70 having a radius of curvature of, for example, 7 millimeters where it merges with outer annular portion 28, and a curved portion 74 having a radius of curvature of, for example, 4.5 millimeters where it merges with inner annular portion 20. Side 54 of each connecting arm 38 forms a curved portion 78 having a radius of curvature of, for example, 3.5 millimeters where it merges with outer annular portion 28. Because of the orientation of the connecting arm 38, such a curved portion does not form where side 54 merges with inner annular portion 20. Instead, a slight curve 82 having a radius of curvature of, for example, 10 millimeters, is formed on side 54 near the merge with inner annular portion 20 to further increase the rigidity of brake disk 10 in the rotational direction indicated by arrow A.

Finally, a plurality of vent holes 84 are formed along the entire circumference of outer annular portion 28, wherein the plurality of vent holes 84 form a plurality of L-shapes. More specifically, three vent holes 84 form the vertical portion of the L-shape, and two vent holes form the horizontal portion of the L-shape.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A one-piece brake disk for a vehicle comprising:
    a radially inner annular portion having a plurality of circumferentially located mounting holes defining a mounting circle, wherein the mounting circle is a circle that intersects the plurality of mounting holes, and wherein an outer peripheral surface of the radially inner annular portion defines an inner arm connecting circle;
    a radially outer annular portion concentric with the radially inner annular portion and having opposite braking surfaces, wherein an inner peripheral surface of the radially outer annular portion defines an outer arm connecting circle;
    a plurality of connecting arms extending from the inner peripheral surface of the radially outer annular portion to the outer peripheral surface of the radially inner annular portion;
    wherein at least one of the plurality of connecting arms has a first side surface facing in a circumferential direction and a second side surface opposite to the first side surface and facing in a circumferential direction, wherein each first side surface and second side surface is continuously straight for a majority of its entire length; and
    wherein a straight phantom line drawn from an outer midpoint of each of the plurality of connecting arms on the outer arm connecting circle to an inner midpoint of that connecting arm on the inner arm connecting circle is tangent to an effective circle concentric with the mounting circle such that each phantom line touches the effective circle at only a single point, wherein the effective circle has a radius greater than a radius of the mounting circle.

2. The brake disk according to claim 1 wherein each of the plurality of connecting arms has a straight middle portion.

3. The brake disk according to claim 1 wherein each of the plurality of connecting arms has the first side surface facing in the circumferential direction and the second side surface opposite to the first side surface and facing in the circumferential direction, wherein each first side surface and second side surface is continuously straight for a majority of its entire length.

4. The brake disk according to claim 1 wherein, for each of the plurality of connecting arms, the straight phantom line intersects the connecting arm along an entire length of the connecting arm.

5. The brake disk according to claim 1 wherein a side surface of each of the plurality of connecting arms, the inner peripheral surface of the radially outer annular portion and the outer peripheral surface of the radially inner annular portion define a plurality of circumferentially disposed openings.

6. The brake disk according to claim 5 wherein, for each of the plurality of connecting arms, the straight phantom line intersects the connecting arm along an entire length of the connecting arm.

7. The brake disk according to claim 6 wherein each of the plurality of connecting arms has a straight middle portion.

8. The brake disk according to claim 1 wherein the radially outer annular portion includes a plurality of circumferentially disposed vent holes.

9. The brake disk according to claim 8 wherein the plurality of vent holes are arranged to form a plurality of L-shapes.

10. The brake disk according to claim 9 wherein, for each L-shape, three vent holes form a vertical portion of the L-shape and two vent holes form a horizontal portion of the L-shape.

11. The brake disk according to claim 10 wherein, for each L-shape, only three vent holes form the vertical portion of the L-shape and only two vent holes form the horizontal portion of the L-shape.

12. The brake disk according to claim 1 wherein the radially inner annular portion includes a plurality of first openings disposed radially outwardly of the plurality of mounting holes.

13. The brake disk according to claim 12 wherein the effective circle intersects the plurality of first openings.

14. The brake disk according to claim 12 wherein each of the plurality of first openings has a generally triangular shape.

15. The brake disk according to claim 13 wherein, for each of the plurality of connecting arms, the straight phantom line intersects the connecting arm along an entire length of the connecting arm.

16. The brake disk according to claim 13 wherein a side surface of each of the plurality of connecting arms, the inner peripheral surface of the radially outer annular portion and the outer peripheral surface of the radially inner annular portion define a plurality of circumferentially disposed second openings.

17. The brake disk according to claim 16 wherein, for each of the plurality of connecting arms, the straight phantom line intersects the connecting arm along an entire length of the connecting arm.

18. The brake disk according to claim 17 wherein each of the plurality of connecting arms has a straight middle portion.

19. The brake disk according to claim 18 wherein the plurality of connecting arms are equally spaced.

20. The brake disk according to claim 19 wherein the radially outer annular portion includes a plurality of circumferentially disposed vent holes.

21. The brake disk according to claim 20 wherein the plurality of vent holes are arranged to form a plurality of L-shapes.

22. The brake disk according to claim 21 wherein, for each L-shape, three vent holes form a vertical portion of the L-shape and two vent holes form a horizontal portion of the L-shape.

23. The brake disk according to claim 22 wherein, for each L-shape, only three vent holes form the vertical portion of the L-shape and only two vent holes form the horizontal portion of the L-shape.

24. The brake disk according to claim 23 wherein, for each of the plurality of connecting arms, the first side surface is parallel to the second side surface.

\* \* \* \* \*